United States Patent [19]

Simmons

[11] 3,776,305

[45] Dec. 4, 1973

[54] HEAT TRANSFER SYSTEM

[75] Inventor: Carl Edward Simmons, Dayton, Ohio

[73] Assignee: United Aircraft Products, Inc., Dayton, Ohio

[22] Filed: Feb. 22, 1972

[21] Appl. No.: 227,779

[52] U.S. Cl. .................... 165/107, 62/467, 165/80, 165/104, 317/100, 165/40, 165/137

[51] Int. Cl. .................... F28d 15/00, H01l 01/12

[58] Field of Search .................... 165/107, 104, 80; 317/100; 174/15; 62/467

[56] References Cited

UNITED STATES PATENTS

| | | | |
|---|---|---|---|
| 3,059,913 | 10/1932 | Sands | 165/107 X |
| 3,477,729 | 11/1969 | Hershey | 165/107 X |
| 3,651,865 | 3/1972 | Feldmanis | 165/105 X |

*Primary Examiner*—Albert W. Davis, Jr.
*Attorney*—J. E. Beringer

[57] ABSTRACT

A heat transfer system in which a fluid of substantial heat absorption qualities is caused to flow in successive heat absorption and heat dissipation phases, a latter having one or more differential modes. In the disclosed embodiment of the system, a cold plate-liquid boiler assembly provides flow paths for the successive phases, the differential heat dissipation modes being provided by the liquid boiler and by external cooling means alternatively included in a heat rejection circuit. Vent control apparatus associated with the liquid boiler tends to maintain a pressure therein conducive of boiling at selected temperature values.

15 Claims, 9 Drawing Figures

HEAT TRANSFER SYSTEM

BACKGROUND OF THE INVENTION

This invention relates to heat transfer systems and has particular although not limited reference to problems of heat dissipation, especially in connection with electronics or like equipment. In use, some such equipment generates a heat flux of potentially self-destructive value. When a process of natural radiation will not reduce equipment temperature to an acceptable level, special provision for cooling must be made. Exposing the equipment to forced or natural air flows is one recourse, but in many instances this is inadequate, undesirable or impossible. Cold plates are known in the art, these being devices which provide a mount for heat producing components and further provide internal flow passages through which heat transport fluid circulates, absorbing heat by a conduction-convection process. Some ultimate heat sink must be provided, however, to accept the heat from the circulating transport fluid and here again heretofore known recourses may be inadequate, undesirable or impossible of use. For example, airborne electronics equipment may advantageously be housed in a closed compartment, as a pod on the exterior of the aircraft. Ambient surroundings in the compartment comprise an inadequate heat sink. Exterior heat exchangers, cooled by air flowing over the pod, are possible but are variabley effective according to the amounts and temperature of air available. In some situations air flowing over the skin of an aircraft is heated due to ram effects resulting from increased flight speed so that the circulated heat transfer fluid, instead of yielding up some of its heat to exterior air, would absorb additional heat therefrom.

SUMMARY OF THE INVENTION

An object of this invention is to obviate prior art problems in regard to the absorption and dissipation of generated heat, particularly although not only in respect of airborne electronics. A system according to the invention utilizes a flowing transport fluid to absorb heat at one or more locations and to dissipate heat at one or more other locations. A combination cold plate-liquid boiler assembly provides for heat absorption and for heat dissipation in a first mode. Heat exchanger means relatively remote from the cold plate-boiler assembly provides for heat dissipation in a second mode. Valve means, sensing changing temperature of the transport fluid, controls and initiates the operational modes. According to a feature of the invention flow to the remote heat exchange means is discontinued both in the presence of a predetermined low temperature at the cold plate means and of a predetermined high temperature at the remote heat exchange means. In another feature of the invention venting of the reservoir is controlled to obtain selected boiling pressures substantially independent of ambient pressures.

Other objects and structural details of the invention will appear more clearly from the following description, when read in connection with the accompanying drawings, wherein.

DESCRIPTION OF ILLUSTRATED EMBODIMENT

Figures 1, 2, 3, 9:
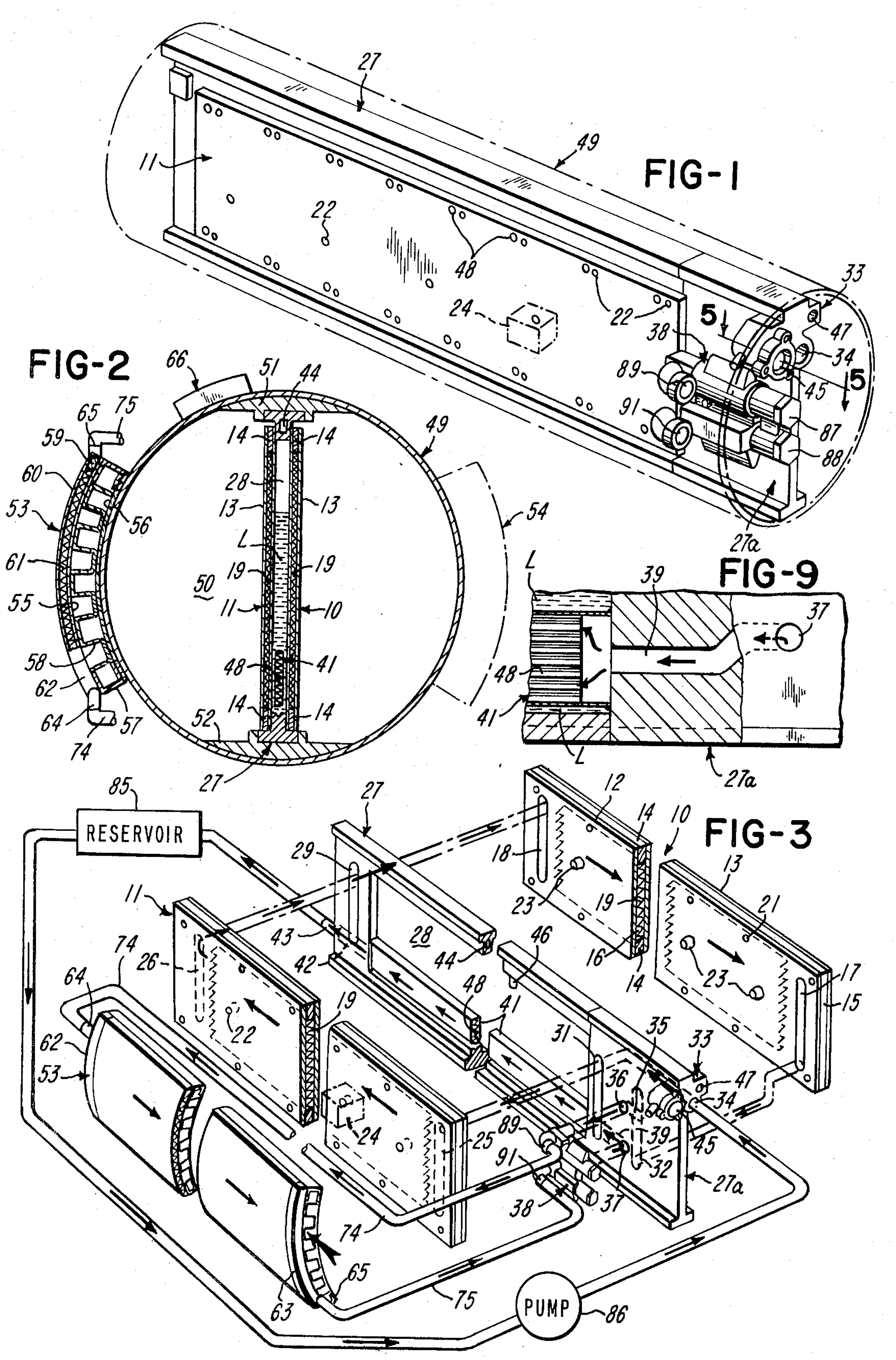
FIG. 1 is a view is perspective of a cold plate-liquid boiler assembly in accordance with an illustrated embodiment of the invention, a pod forming an enclosure for such assembly being diagrammatically indicated.
FIG. 2 is a view in cross section through a pod and contained cold plate-liquid boiler assembly, the section being taken through surface cooler units mounted on the pod and forming a part of the heat transfer system.
FIG. 3 is an exploded perspective view of the cold plate-liquid boiler assembly and of one of the surface cooler units used in conjunction therewith, valve controlled flow of the transfer fluid being diagrammatically indicated.
FIG. 9 is a detail view relatively enlarged, of a cold plate section, showing the water boiler tube.
Figures 4, 5, 6, 7, 8:
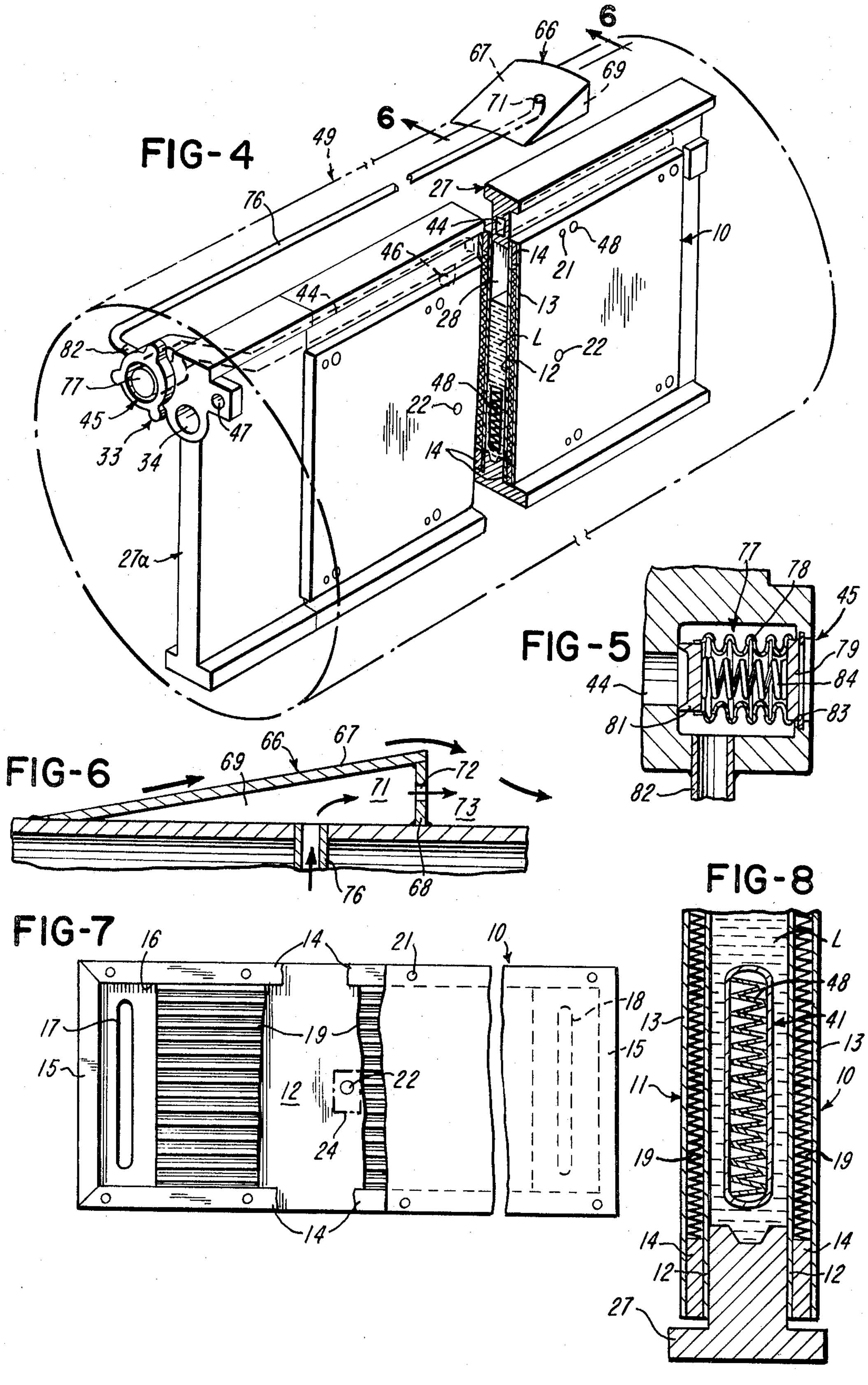
FIG. 4 is a partly diagrammatic view of a cold plate-water boiler assembly, showing a means to vent the boiler to a ramp structure on the pod providing a low pressure discharge location.
FIG. 5 is a detail view, taken substantially along the line 5—5 of FIG. 1.
FIG. 6 is a fragmentary view taken substantially along the line 6—6 of FIG. 4.
FIG. 7 is a view in side elevation of a cold plate unit, partly broken away to show the interior structure.
FIG. 8 is a detail fragmentary view, partly diagrammatic, of a connection to the liquid boiler tube.

Referring to the drawings, the invention is for illustrative purposes disclosed as embodied in an avionics cooling system. In the illustrative embodiment a cold plate-liquid boiler assembly directly mounts heat producing components. It is enclosed in a pod forming a fixed part of an aircraft or attached to the aircraft. In flight of the aircraft, atmospheric or ram air flows over the pod or is ducted to flow thereover. A complete cooling system may include a plurality of plate-boiler assemblies, and supplemental elements, connected in special relationships to achieve certain specific results. Only so much of the system is here disclosed as is necessary for an understanding of the present invention, and, in addition, some portions of the assembly and associated controls are shown in diagrammatic form where the exact involved structure is conventional or may assume various known forms. Moreover, the illustrated relationship of the parts is that found most convenient for disclosure of the invention and is not necessarily the relationship which is or would be most practical in an actual practice of the invention.

As seen in the drawings, a cold plate-liquid boiler assembly according to the illustrated embodiment comprises a pair of cold plates 10 and 11 which insofar as an understanding of the present invention is concerned, may be regarded as being substantially identical. Considering the plate 10, by way of example, it is comprised of rectangular, flat plate elements 12 and 13 separated by marginal spacer strips 14 and 15 to define an elongated, narrow interior space 16. In the plate element 12, at opposite ends of the space 16 are respective laterally elongated openings 17 and 18. A fin strip 19 made of thin, ductile sheet material disposes in space 16, extending substantially to the openings 17 and 18. The plate elements 12 and 13 are brazed or otherwise joined together through marginal spacers 14 and 15 in a manner to make the cold plate a unitary structure closing and sealing the space 16, except for access openings 17 and 18.

The cold plate unit has a plurality of marginally disposing through openings 21 used, as will hereinafter more clearly appear, in the bolting of the cold plate units into a single assembly. In addition, the plate element 13, which may be regarded as the outwardly facing plate element has a plurality of tapped recesses 22, at least some of which may extend through space 16 and terminate in bosses 23 on the interiorly facing side of plate element 12. Recesses 22 may appear also in the margins of the cold plate unit. They have as their purpose the presenting of a means for mounting of heat generating electronic or like components, here diagrammatically indicated at 24.

The cold plate 11 is, or may be, constructed substantially identical to the plate unit 10. It provides inwardly facing laterally elongated openings 25 and 26 corresponding to the described openings 17 and 18 in plate unit 10. The component mounting recesses 22 in the respective plate units are variously located in accordance with the installation requirements of the electronic components.

Further comprised in the cold plate-liquid broiler assembly is a frame member 27 shaped like the cold plate units but exceeding their dimensions. A portion of the frame member 27 is cut out intermediate its edges to define an open interior space 28. The ends of the frame member, beyond the ends of space 28, are cored out to define integrated flow passageways which are here indicated, in the main, in diagrammatic form since it appears unnecessary to illustrate such passageways in exact structural detail. At one end of the frame member is a laterally elongated through opening 29 substantially corresponding in configuration to the cold plate openings 18 and 26. The frame member at its opposite end is relatively extended. For purposes of easier fabrication, the portion of member 27 which includes opening 29 at one end thereof may be considered an integrally formed portion with the described opposite end constructed as a separate cast portion welded or otherwise secured to the basic member as an extension thereof. The described extension, which may be identified as 27$a$, has the described cored passages therein which may include laterally elongated slots 31 and 32 substantially corresponding respectively to the cold plate slots 25 and 17. Forming a part of the described end casting 27$a$ is an expanded fitting portion 33, a part of which is a coolant inlet receptacle 34. As diagrammatically indicated, inlet receptacle 34 directly communicates with slot 31. Slot 32 communicates through an interior passage 35 with a port 36 opening through one side face of the extension 27$a$. Another port 37 opens through the same side face of extension 27$a$. A valve assembly 38 mounts to the extension 27$a$ in a closing, communicating relation to the ports 36 and 37.

Within frame member 27 and its extension 27$a$ the port 37 connects by way of a passage 39 to an adjacent end of the space 28. Within space 28 a heat exchange tube 41 disposes in a longitudinal sense with one end suitably connected in a closed, communicating relation with the passage 39. At its opposite end the tube 41 connects in a similar manner to an interior passage 42 leading to a coolant outlet receptacle 43.

The frame member 27 includes, or may include, other structural features pertinent to its application. Of interest in connection with the present invention is a longitudinal flow passage 44 in what may be considered the upper marginal edge of the frame member and which extends at one end to a steam valve socket 45 in the fitting 33. The inner end of passage 44 terminates within the frame member. A tubular insert means 46 projects radially therein to communicate the passage with the space 28 in an upper part thereof. Still further, the fitting 33 includes a liquid fill receptacle 47 also communicating, in a manner not fully shown herein, with the space 28.

The cold plate-liquid boiler assembly is put together by bringing the cold plates 10 and 11 into superposing contacting relation to opposite side faces of the frame member 27. Plate 10 is positioned to have slot 17 thereof in aligned communicating relation with slot 32 and to have slot 18 thereof in aligned communicating relation with slot 29. Similarly, plate 11 is positioned to have its slot 25 in aligned communicating relation with slot 31 and to have its slot 26 in aligned communicating relation with slot 29. Bolts 48, installed through openings 21, hold the cold plates in close fitting contact to the intermediate frame member, yet allow for a simple disassembly of the parts when this may be desired. Preferably, suitable gasket or sealing means are interposed between each cold plate and the frame member in surrounding relation to the space 28 and in surrounding relation to each of the slots 29, 31 and 32. Space 28, by virtue of the mounting of cold plates 10 and 11 to the sides of member 27, assumes the character of an enclosed chamber. By the connection including fill receptacle 47, water or other appropriate heat sink liquid is introduced into the space 28 and fills the space to a height fully submerging heat exchange tube 41. Space 28 accordingly constitutes a liquid reservoir, the side walls of which are provided by the cold plates 10 and 11. In conjunction with heat exchange tube 41, the liquid reservoir defines a liquid boiler in which heat from the tube 41 is transmitted into the surrounding body of liquid and under appropriate circumstances effects a phase change in the liquid to a vapor form. The vapor or steam is allowed to escape through tube 46 and vents from the assembly by way of passage 44 and steam outlet receptacle 45, as will hereinafter be more clearly described. Tube 41 may assume a variety of forms, including those of conventional tubular and plate-fin heat exchangers. In the illustrated instance it is comprised of a single tube flattened to lie within the confines of space 22 and containing fin strip means 48.

In an installation according to the present embodiment of the invention, the cold plate-liquid boiler assembly is mounted on edge within a pod 49. The latter is a device of tubular shape, closed at its ends to define a closed interior compartment 50 and is suitably disposed to have ram air flow over its exterior. The cold plate-liquid boiler assembly is mounted on edge within compartment 50, upper and lower side edges having a sliding mounting in track fittings 51 and 52 occupying diametrically opposed positions on the pod interior surface. The described side edges of the frame member 27 may be suitably flanged for better cooperative engagement in the fittings 51 and 52.

As will hereinafter more clearly appear, the cold plates 10 and 11 provide for a heat absorption mode while the described liquid boiler provides for a first heat dissipation mode. Providing for a second heat dissipation mode are surface cooler units 53 and 54. These are mounted to the exterior of pod 49 in the path of flow of the ram air. Two such units are shown but it will be understood that a lesser or greater number may be provided in accordance with heat rejection requirements. Each surface cooler unit is a complete subassembly. It comprises spaced apart arcuately configured plates 55 and 56 separated by marginal spacers 57. Between the spacers 57 is fin strip means 58 of relatively broad convolution. The plates 55 and 56 and spacers 57 define flow passage means closed at its sides and open at its ends, the sub-assembly being oriented so that ram flow over the pod is constrained to pass through the defined passageway. In outwardly spaced relation to the plate 55 is a further plate 60 positioned by marginal spacer means 59 disposing at right angles to spacers 57. A flow passageway is defined between plates 55 and 60 in counter flow relation to the passage defined by plates 55 and 56 and in the second described passageway is strip fin means 61. Further, opposite ends of the described passageway are closed by manifolds 62 and 63. The former has an inlet connection 64. The latter has an outlet connection 65.

Also on the exterior of the pod 49 is a ramp device 66. A wall 67 merges at one end with the pod surface and at its other end is elevated relatively to the pod surface. A wall 68, dependent from the elevated end of wall 67, and side walls 69, complete a chamber which, as will hereinafter more clearly appear, comprise a steam vent chamber 71. The chamber 71 opens through a port 72 to ambient surroundings exterior to the pod. The ramp device 66, like the surface coolers 53 and 54, is suitably secured to the pod exterior, as by a brazing or like connection. The ramp device disposes generally parallel to the surface coolers and is so oriented in relation to the direction of flow of the air stream passing over the pod as to give the depressed or lower end of the inclined wall 67 the character of the leading end thereof and the opposite or raised end the character of the trailing end. The exterior pod surface defines with vertical wall 68 a region 73 immediately adjacent the trailing end of the ramp device in which pressure is reduced below ambient in response to air flow over the ramp device. The reduced pressure is applied through port 72 to steam vent chamber 71.

The connections from the cold plate-liquid boiler assembly within the pod to the surface coolers and ramp device exterior to the pod are provided by suitable conduit means extending to and through the pod wall. These connections may take any appropriate form and are in the present instance only diagrammatically illustrated. Thus, and as shown in FIG. 3, conduit means 74 extends from valve 38 to inlet connection 64 on manifold 62 while conduit means 75 extends from outlet connection 65 on manifold 63. The conduit means 74 and 75 are shown in FIG. 3 as extending only to a single surface cooler unit. It will be understood, however, that they are or may be simultaneously connected to both surface cooler units 53 and 54 as well as to any others which may be provided. The steam outlet receptacle 45 is connected by conduit means 76 to the steam vent chamber 71.

Within the steam outlet receptacle 45 is a bellows type absolute pressure relief valve unit 77. The unit 77 comprises a bellows 78 unitarily joined at its ends to a base body 79 and to a valve portion 81. The device seats within a relatively enlarged bore comprising the receptacle 45 and valve portion 81 is adapted to seat in the bottom thereof in a position closing passage 44. A lateral outlet 82 from receptacle bore 45 serves as a means of connection to the conduit means 76.

The bellows device 77 may be installed in receptacle bore 45 to have its body base portion 79 limit against a removable abutment ring 83. The interior of the device is evacuated to reflect a substantially 0 psia reference pressure. A compression spring 84 is within the bellows based on body portion 79 and engaging valve portion 81. The spring 84 is selected for its ability to maintain valve portion 81 normally in a seated or closed position under low ambient pressures and to allow unseating or opening of the valve in the presence of an absolute pressure as determined by the desired interior pressure of the liquid reservoir as defined by space 28 and the cooperating cold plates 10 and 11. The reservoir pressure is applied through passage 44 to the external face of the valve portion 81 substantially axially of the bellows device. The effective cross sectional area of the bellows is approximately equal to the sealing diameter of the valve portion, thereby eliminating the effects of ambient pressure. The valve modulates, or moves between open and closed positions, at relatively low reservoir pressures.

SYSTEM OPERATION

The system operates to cool electronic components contained in the pod 49, mounted, as in the manner diagrammatically indicated at 24, to outwardly facing side walls of the cold plate units 10 and 11. Cooling is accomplished by rejecting heat to a liquid coolant which is circulated through cold plates 10 and 11 in heat transfer relation to the components 24. The coolant is a natural or synthetic fluid having appreciable properties of heat absorption. A fluid having the commercial designation Coolanol 20 is suitable for the purpose.

After absorbing heat in the cold plates 10 and 11, the coolant is circulated through one or more heat dissipation modes and, with its temperature substantially reduced, is recirculated through the cold plates in another operational cycle. The coolant circuit may include a reservoir 85 in common communication with the coolant inlet 34 and the coolant outlet 43, a pump 86 being disposed in the circuit between reservoir 85 and coolant inlet 34.

In the operation of the system, pump 86 draws coolant from the reservoir 85 and delivers it under pressure to inlet 34. The latter is in communication through the mating slots 31 and 25 with the interior space of cold plate 11. It flows longitudinally through such space, contacting the fin strip 19 and leaves the cold plate by way of slot 26. In the course of travel through the plate, between slots 25 and 26, the coolant absorbs heat from the outwardly facing wall of the plate and from the heat generating components 24 installed therein. The fin strip 19 acts as supplemental or secondary heat transfer surface, so that heat from the outwardly facing wall of the plate may be rejected more efficiently and more completely into the flowing coolant.

From slot 26, the coolant passes through slot 29 in frame member 27 and enters cold plate 10 by way of slot 18 therein. Flow through the interior of the cold plate 10 is repeated in the same manner with the same effect as in cold plate 11 but in a reverse direction. In the operation of the system, when the components 24 are generating heat, the coolant emerges from slot 17 at the discharge end of cold plate 10 in an appreciably heated condition as a result of successive flow through the plates 11 and 10. Emerging from slot 17, the coolant enters slot 32 in the frame extension **27*a* and is conducted through passage 35 and port 36 to the valve means 38. The valve means 38 is a form of diverter valve and has not been here shown in detail since known, generally conventional devices exist for performing its assigned function. Thus, thermostatic elements 87 and 88 are in the valve means and control suitable diverter valve elements. The temperature of the coolant entering the valve means by way of port 36 is sensed and if found to be below a selected high value is discharged directly to port 37 and conducted by passage 39 to the liquid boiler where it enters and flows longitudinally through heat exchange tube 41. In the tube 41, the heat of the coolant is conducted by fin material 48 and by the walls of the tube into the contained body of water which submerges the heat exchange tube. The now cooled or cooler coolant discharges from tube 41 into flow passage 42 and is conducted thereby to the coolant outlet receptacle 43. From outlet 43, the coolant is shown in the illustrated instance as returning directly to the reservoir 85 for recycling by the pump 86. In lieu thereof, of course, the coolant could be caused to flow to additional cooling means or to other heat-cool apparatus before being returned to the reservoir 85.**

If the temperature of the coolant emerging from port 36, as sensed by the valve means 38, is found to exceed the selected high value it is diverted from port 37 and directed instead to an outlet 89 connected by conduit means 74 to the surface cooler inlet manifold 64. There the coolant distributes itself in manifold 62 and flows through the passage defined by plates 55 and 60 to the opposite manifold 63 and outlet connection 65. Within the described flow passage the coolant rejects heat through the plate 55 to air flowing longitudinally over the fin means 58 contained in the passage defined by plates 55 and 56. From outlet connection 65, the coolant returns to the valve means 38 by way of conduit means 75 attaching at one end to the outlet connection 65 and at its other end to an inlet connection 91 on the valve means. As before mentioned, the flow from and to the surface cooler apparatus may occur simultaneously with respect to two or more installed surface coolers.

The coolant returning from the surface cooler or coolers is directed to port 37 and conducted to heat exchange tube 41 from which it leaves the system by way of outlet connection 43. Within the valve means, however, the returning coolant has its temperature sensed and if the temperature is found to exceed a selected high value valve means 38 operates to shut off flow to the surface coolers and compel all of the coolant flow emerging from port 36 to pass directly to port 37 and the water boiler. The surface coolers are intended to have a cooling function but under some conditions may instead add heat to the flowing coolant. For example, at high speed flight at relatively low altitudes, ram air impacting on the surface coolers may create heat so that the air flowing through the surface coolers may be at a temperature greater than the temperature of the coolant flowing through the surface coolers. Under these conditions the fluid coolant, instead of rejecting heat to the air absorbs heat therefrom and reaches the valve means 38 additionally heated rather than being cooled. It is desirable under these conditions to by-pass the surface coolers.

Within the liquid boiler of frame member 27, the liquid surrounding tube 41 absorbs rejected heat and under appropriate pressure-temperature conditions undergoes a phase change from liquid to vapor, in the process absorbing additional heat energy from the coolant flowing through the heat exchanger tube. The vapor rises through the liquid reservoir and in the space above the liquid level has access to outlet 46. In an open position of bellows valve device 77, the released vapor or steam flows through passage 44 to steam outlet 45. It exits from there by way of connector 82 into conduit means 76 leading to vent chamber 71 formed within the ramp device 66 on the exterior of the pod. Chamber 71 communicates through opening 72 with the trailing end of the ramp device and in particular with region 73 of depressed pressure. A more facile evacuation of chamber 71 is provided for, with the pressure level of such chamber and communicating passages back to outlet receptacle 45 being correspondingly depressed. The arrangement, it will be understood, lends itself to conditions of controlled boiling within the liquid reservoir whereby boiling may occur at a selected pressure value, which value may be less than atmospheric. Thus, the spring 84 in bellows 78 is selected to maintain valve portion 81 closed until the vapor pressure in the reservoir reaches a predetermined high value. As this pressure is reached and exceeded, valve portion 81 lifts from its seat and steam from the reservoir passes into and out of receptacle bore 45 to steam vent chamber 71, to be there evacuated to ambient surroundings. The relatively depressed pressure reflected in the receptacle bore 45 will not tend to hold the valve open so that it may reclose when pressure within the reservoir drops to and below the selected value. The arrangement enables the liquid boiler to be fully operational substantially independently of ambient pressures. For example, high speed operation of the aircraft at comparatively low altitudes may find the flowing coolant in substantial need of cooling. However, atmospheric pressures in the liquid reservoir may establish boiling conditions at levels such as 212° F so that the temperature of the coolant flowing through tube 41 cannot be reduced below some relatively high value, as on the order of 230° F. In accordance with the present inventive concept, however, the bellows device 77 may be set to open at some selected relatively low pressure without admitting pressure fluid of higher pressure to the reservoir. The result is that the system may be constructed to induce boiling of the heat sink liquid at relatively low pressure-temperature conditions, maintaining a lower coolant temperature, as for example on the order of 190° F.

In an operational mode which finds the coolant or transport fluid flowing through the surface coolers, the fluid is at a relatively low temperature as it passes through water boiler tube 41. If the heat sink liquid in the reservoir is at a higher temperature, as it may be as a result of immediately preceding high speed low altitude flight, there is an exchange of heat from the coolant to the reservoir liquid with a temperature modulating effect on both.

The invention in its illustrated embodiment has been disclosed in a partly diagrammatic form for reasons of simplicity and clarity. An actual working embodiment of the invention may find the structure differently arranged and may find the presently disclosed system to be merely a part of a larger system including, for example, multiple cold plate-liquid boiler assemblies, with or without accompanying surface coolers. In an arrangement of that kind, the coolant inlet 34 and coolant outlet 43 may be constructed as quick connect-disconnect fittings facilitating mounting of the cold plate-liquid boiler assembly in a series relation with other like or similar assemblies. Similarly, the direction of flow of the coolant through the cold plates may be varied and selected plates taken out of the flow circuit as may be found necessary or desirable. With further regard to the cold plates it will be noted that since the cold plates are structural elements in the makeup of the liquid boiler, the interiorly facing plates 12 thereof are in contact with liquid in the liquid reservoir. Some of the heat absorbed into the cold plates and component parts thereof accordingly is rejected directly to the liquid in the liquid reservoir. Under some conditions it may be desirable to include the amounts of heat yielded up to the liquid in this manner in overall calculations of heat rejection.

The ramp device 66 has been shown as a separate assembly mounted along side the surface coolers 53 and 54. It may be that for purposes of structural convenience this assembly would preferably be integrated into one of the surface coolers to superimpose thereon or to project therefrom in a trailing relation.

The invention provides for a single heat absorption mode and for plural heat dissipation modes. This relationship may, of course, be altered in accordance with foregoing comments. The invention lends itself to a modular concept in which the cold plate-liquid boiler assembly as disclosed is a single module in connection with which other like or similar modules may be used in a series or parallel relation.

The invention has been disclosed with reference to a particular embodiment. Structural modifications have been discussed and these and others obvious to a person skilled in the art to which the invention relates are considered to be within the intent and scope of the invention.

What is claimed is:

1. A heat transfer system utilizing a flowing transport fluid to absorb heat at one or more locations and to dissipate absorbed heat at one or more other locations, including cold plate means for mounting heat generating components and a liquid boiler in which generated heat is released to stored heat sink liquid and subsequently liberated in steam form, said cold plate means comprising a pair of cold plates having outwardly disposing faces to mount heat generating components, said plates providing internal flow paths in which a flowing transport fluid is in a heat absorbing mode, means mounting said cold plates in such spaced, marginally sealed relation as to cause inwardly disposing faces thereof to define a reservoir for heat sink liquid therebetween, means for flowing recirculating transport fluid heated by passage through said cold plates in a heat dissipating mode through said reservoir in a segregated heat transfer relation to liquid contained therein, and means for venting created steam from said reservoir.

2. A heat transfer system according to claim 1, said inwardly disposing faces of said cold plates defining walls of said reservoir whereby the transport fluid flowing in said plates is simultaneously in heat transfer relation to said heat generating components and to liquid in said reservoir.

3. A heat transfer system according to claim 1, characterized by means defining a flow circuit bringing a flowing transport fluid through said cold plates and in a sequential relation thereto through said liquid reservoir.

4. A heat transfer system according to claim 1, wherein the means mounting said cold plates includes a frame-like member to opposite faces of which said cold plates are attached, a portion of which is cut out to define in conjunction with opposing inwardly disposing faces of said cold plates the said liquid reservoir.

5. A heat transfer system according to claim 4, characterized in that the means flowing transport fluid through said reservoir includes heat transfer conduit means bridging the cutout portion of said frame-like member, said member providing internal passageway means to and from said conduit means.

6. A heat transfer system according to claim 5, wherein said cold plates, said frame-like member and said conduit means are joined together to form a unitary cold plate-liquid boiler assembly, said assembly providing inlet and outlet connections for said transport fluid.

7. A heat transfer system according to claim 6, wherein said assembly further provides connecting and cross over passages whereby fluid entering said inlet connection is directed through said cold plates in series order and is then directed by way of said conduit means to said outlet connection.

8. A heat transfer system according to claim 1, wherein a pod disposes in use in a flowing heat sink fluid, said pod being closed to confine said heat sink fluid to flow over the pod exterior, the recited elements of claim 1 being joined together to form a unitary cold plate-liquid boiler assembly, said assembly mounted within said pod, and means selectively to flow transport fluid heated by passage through said cold plates in a second heat dissipating mode into heat transfer relation with heat sink fluid flowing over said pod.

9. A heat transfer system according to claim 8, characterized by valve means controlling utilization of the said second heat dissipating mode.

10. A heat transfer system according to claim 8, wherein said last named means includes surface cooler means mounted to the exterior of said pod, said surface cooler means providing adjacent flow passages respectively for the heat sink fluid and for the transport fluid whereby the excess heat of one fluid may be rejected to the other by a convection-conduction-convection process, the cold plate-liquid boiler assembly connecting to said surface cooler means through said pod for a flow of transport fluid to and from said surface cooler means.

11. A heat transfer system according to claim 10, characterized by a fluid circuit interconnecting said cold plate-water boiler assembly and said surface cooler means, said circuit including valve controller means sensing a changing temperature of the transport fluid after flowing through said cold plates and sensing the same said changing temperature of the transport fluid after flowing through said surface cooler means and operable either in the presence of a predetermined low temperature of the transport fluid as it emerges from said cold plates or in the presence of a predetermined high temperature as it emerges from said surface cooler means to divert flow emerging from said cold plates directly into the first said heat dissipation mode in by-passing relation to said surface cooler means.

12. A heat transfer system according to claim 1, wherein said venting means is controlled to define a minimum low pressure in said reservoir and artificially to maintain relatively low pressures in said reservoir irrespective of relatively high ambient pressures to provide for low pressure boiling in said reservoir.

13. A heat transfer system according to claim 12, wherein said venting means includes a control valve closing in the presence of an absolute vapor pressure in said reservoir of selected value.

14. A heat transfer system according to claim 13, characterized by means artificially to reduce the environmental pressure in which said valve operates to provide conditions under which said valve may be set to modulate at vapor pressure conditions in said reservoir of lesser value than would be possible if said vapor pressure corresponded to that of ambient surroundings.

15. A heat transfer system according to claim 14, wherein said cold plate means is enclosed in a pod disposing in an exterior stream of flowing gas, the said means artificially to reduce the environmental pressure including an inclined ramp on said pod, the relatively elevated end of said ramp being the downstream end in relation to the direction of travel of the external stream of flowing gas, and including further a connection to sense the pressure at and immediately beyond the downstream end of said inclined ramp.

* * * * *